Jan. 1, 1963  F. J. LUKETA  3,070,916
METHOD AND APPARATUS FOR HANDLING TRAWL NETS
Filed April 7, 1960  4 Sheets-Sheet 1

INVENTOR.
FRANK J. LUKETA
BY
Reynolds, Beach & Christensen
ATTORNEYS

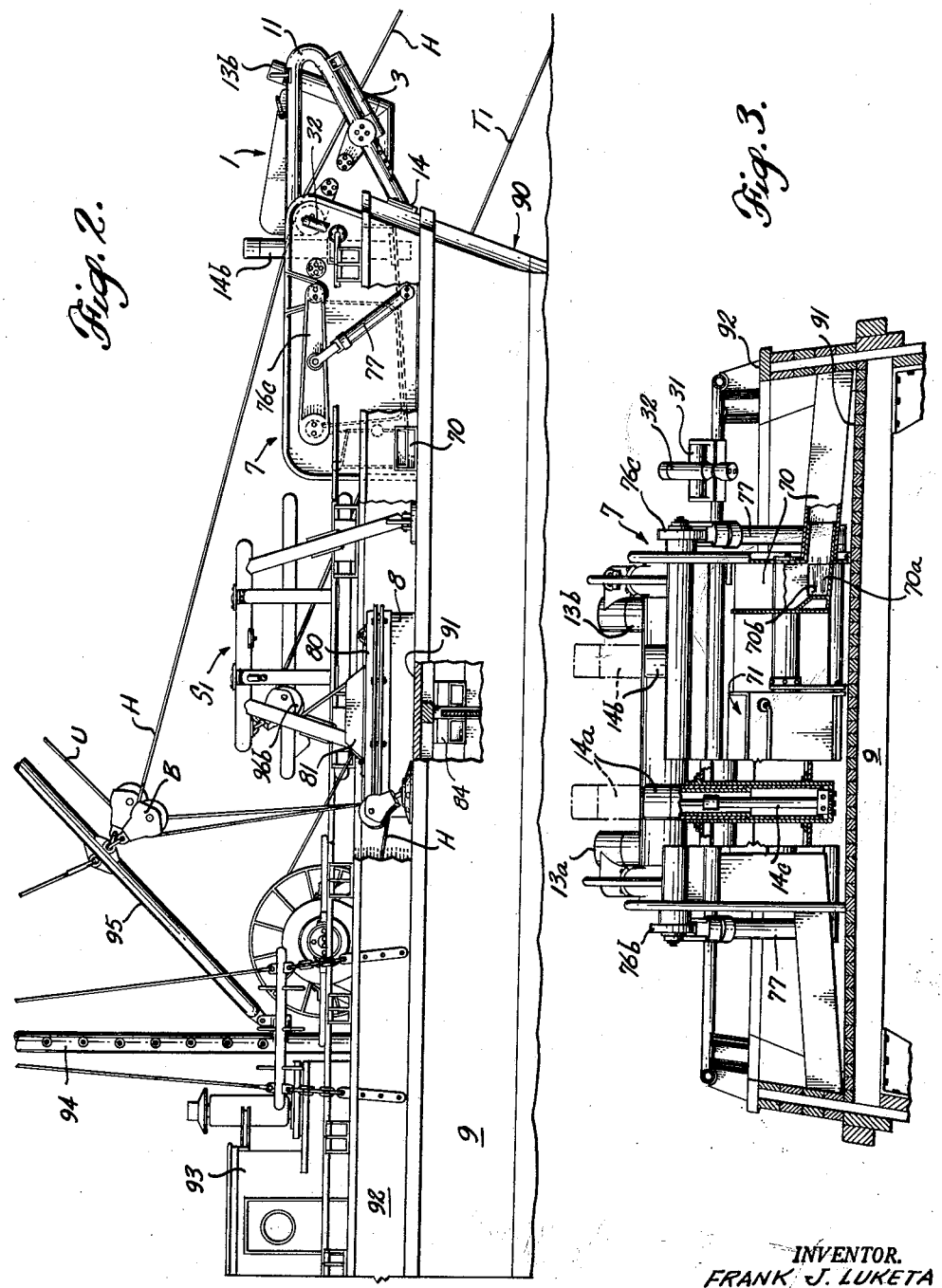

Jan. 1, 1963 F. J. LUKETA 3,070,916
METHOD AND APPARATUS FOR HANDLING TRAWL NETS
Filed April 7, 1960 4 Sheets-Sheet 3

INVENTOR.
FRANK J. LUKETA
BY
Reynolds, Beach + Christensen
ATTORNEYS

Jan. 1, 1963 F. J. LUKETA 3,070,916
METHOD AND APPARATUS FOR HANDLING TRAWL NETS
Filed April 7, 1960 4 Sheets-Sheet 4
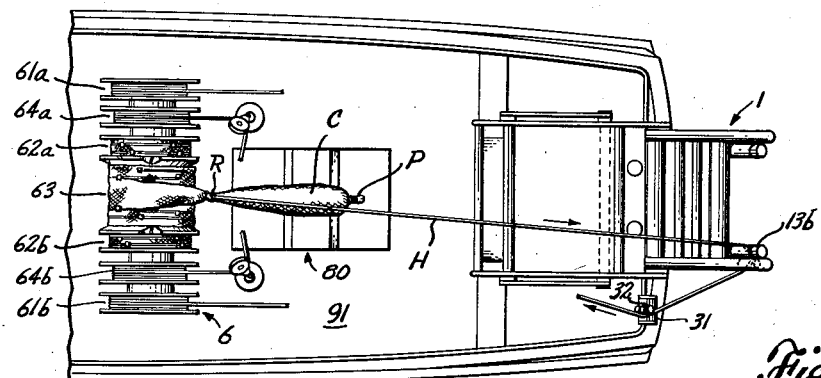
Fig. 5.
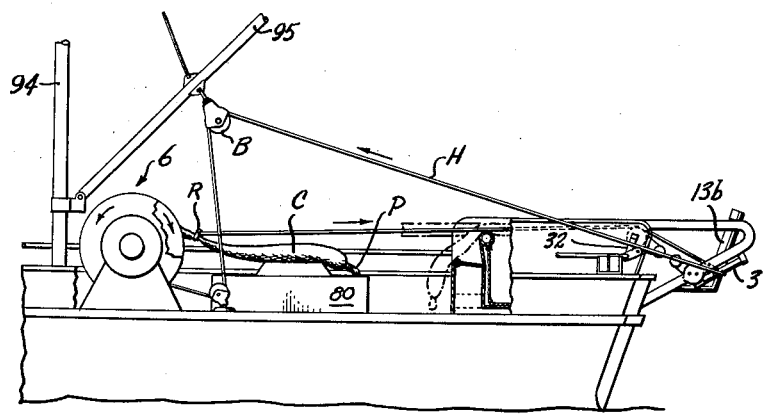
Fig. 6.
Fig. 7.
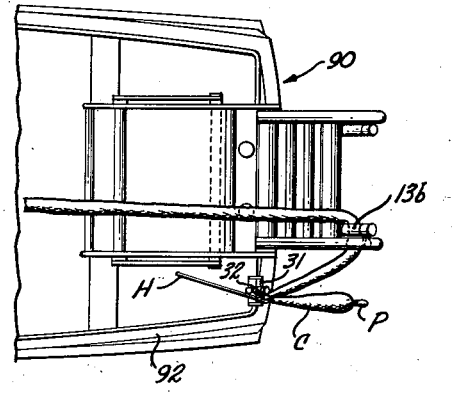
Fig. 8.
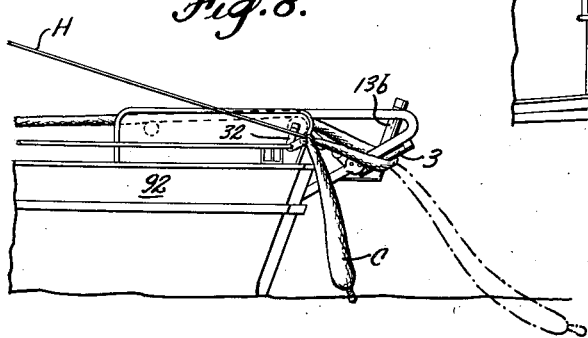
INVENTOR.
FRANK J. LUKETA
BY Reynolds, Beach
+Christensen
ATTORNEYS

United States Patent Office 3,070,916
Patented Jan. 1, 1963

3,070,916
METHOD AND APPARATUS FOR HANDLING TRAWL NETS
Frank J. Luketa, 5567 Greenwood, Seattle, Wash.
Filed Apr. 7, 1960, Ser. No. 20,582
11 Claims. (Cl. 43—4.5)

This invention pertains primarily to trawling vessels of the type and size commonly in use for catching shrimp. Vessels such as are now in use are usually of smaller size than trawlers which catch bottom fish, and have less deck space. They do not haul in the net upon a reel, but depend in large measure upon the physical labor of a small crew, usually three men.

In previous applications (for example Serial No. 570,771, filed March 12, 1956, now abandoned, and now superseded by continuation application Serial No. 132,234, filed August 17, 1961) I have disclosed otter trawling vessels which haul in a trawl net by reeling it in over the stern, until the codend is to an appreciable extent wound upon a drum of a multiple winch means disposed athwartship on the after deck; a ramp directed aft and outboard of the stern supports such a loaded net as it is being reeled in. The present invention aims to employ similar principles in shrimp trawling, even though the space and manpower available are so much less than aboard an otter trawler, to the end that much of the labor heretofore incident to shrimp trawling, including the setting of the net, may be eliminated, and the productive time of the vessel and crew are augmented. This invention pertains to the vessel and its equipment, in combination, to the ram adapted to shrimp trawling (and other trawling as well), and to a method of setting such a trawl net.

More specifically, and in one phase, this invention pertains to a special ramp for supporting the net during hauling, both in and out, directly over the stern. It pertains also to the method whereby such a net may be set, trailing directly aft over the ramp, with but slight labor. It pertains also to the relationship of such a ramp and a winch means installed generally amidship and athwartwise, in the hauling in and out of the net.

The invention is shown in the accompanying drawings in a presently preferred form, and in conjunction with other mechanism useful in segregating the shrimp from the debris which is always part of the haul of a shrimp net, and which will constitute the subject-matter of a companion application.

FIGURE 2 is a side elevational view of the same, broken away in part.

FIGURE 3 is a transverse sectional view, generally along the line 3—3 of FIGURE 1.

FIGURE 5 is a simplified plan view, and FIGURE 6 a corrseponding side elevational view, illustrating the beginning of a haul-out operation, to set the net.

FIGURE 7 is a similar plan view, and FIGURE 8 a corresponding side elevational view, illustrating a later phase of the net setting operation.

Figure 1:
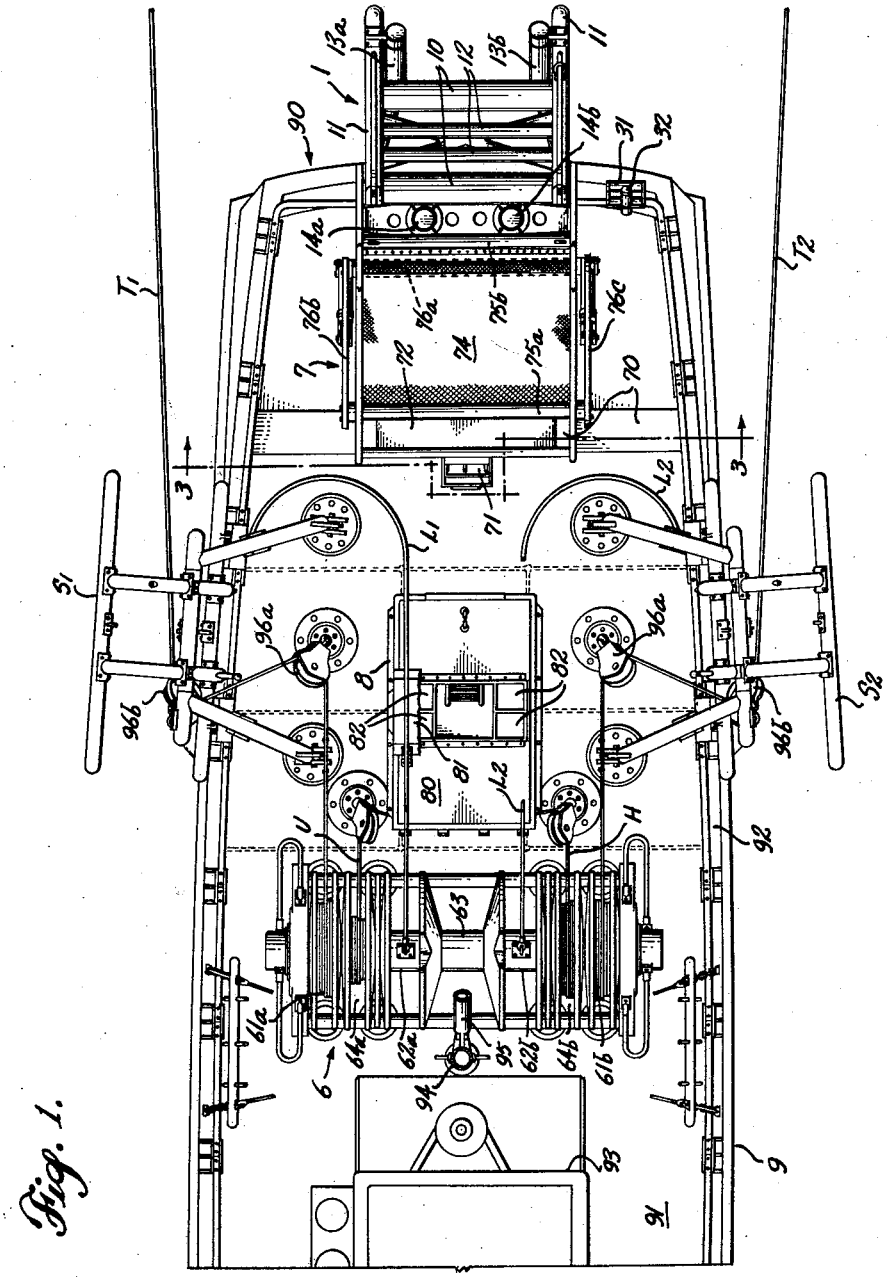
FIGURE 1 is a plan view of the trawler, with its net set, but omitted from the drawing.

The trawler hull is designated in general by the numeral 9, and has a stern 90, deck 91, and bulwarks 92. A deck house 93 is usually placed somewhat forward of amidship, and a mast 94 and boom 95 rise just aft of the deck house. A hatch 8 and main hatch cover 80 afford access to the hold space where refrigerated shrimp are stowed pending their marketing, while a smaller hatch cover 81 affords access to chutes 82, leading by way of lower termini 84 to stowage space below the deck 91.

Details of the cargo-handling devices and mechanism will be more fully disclosed and claimed in a companion application. The shrimp are segregated from the debris which the net also brings up, and the shrimp are decapitated, on the open after deck, but segregating means for disposal of the debris and heads is provided in the trawler illustrated, being generally indicated at 7, and will constitute the subject matter of another companion application.

The trawl net is dragged by two trawl warps T1 and T2 which extend over the opposite sides of the vessel, and downwardly and outwardly to doors (not shown) ahead of the net, whereby its wings are spread. These warps are reeled upon drums 61a and 61b of a winch means 6, disposed athwartwise on deck just aft of the mast 94; they are guided by line guides 96a and 96b, the latter on the stanchions S1, S2 at each side. Usually the shrimper has out a small trynet, ahead of the main net, which he can haul in readily from time to time, to determine if he is in an area where shrimp are abundant. A line H extending over the stern from the boom, and reeled upon a drum 64b of the multiple-drum winch means 6, drags the trynet. Line U leading from drum 64a is used for utility lifting.

Although the trawl warps T1, T2 extend over the sides, the main net must be hauled in over the stern. The manner in which this can be accomplished is explained in my applications Serial Nos. 570,771, filed March 12, 1956, and 132,234, filed August 17, 1961. In order to guide the net laterally, to assist in setting the net, to afford support for the net, and in particular its codend, and to assure that the net will not foul the propeller or the rudder during hauling in and out, a ramp structure is provided, according to this invention, which projects aft of and outboard from the stern 90. It is generally designated by the numeral 1, and includes a platform for the support of the net and guides spaced at the opposite sides of the platform to restrict the lateral extent of the net, particularly as it is being hauled in. The platform is shown as including the main transverse rollers 10 supported in braced-apart side brackets 11 and intermediate rollers or bars 12 similarly supported. The brackets 11 may extend above the level of the platform and constitute the lateral guides referred to. Generally upright rollers 13a and 13b at the sternmost end of the ramp structure 1 also serve as side guides. They cooperate with paired upright line guides 14a, 14b to maintain the lines and net curtains correctly aligned with their drums 62a, 62b of the winch means during hauling in. Reference is made to my copending application Serial No. 856,806, filed December 2, 1959, for a fuller understanding of these line guide means.

The ramp structure is mounted, coaxially of its inboard roller 10, to swing up and inboard from its position of use, that shown in the drawings, to a stowed position. This will be later referred to in greater detail. In its position of use it is fixed to the stern 90 at 14, but can be released for swinging inboard.

The line H, used during trawling for dragging and hauling a trynet, has a dual function. Since the trynet, which drags ahead of the main net whenever it is used, must be hauled in before hauling in the main net, the line H is available for use as a setting-out or haul-out line for the main net. Line guide means are provided at the sternmost portion of the ramp structure, at 3, about which such a haul-out line H may extend, and further line guide means 31, 32 are provided at the bulwark 92, spaced ahead of the guide means at 3, and located at least at one side of the ramp structure. The further means shown are roller 13b about which the line extends. All such line guide means should be non-confining, for they will also guide the net.

During trawling the ramp 1 is extended aft and outboard of the stern, in the position shown in the drawings. When the net is to be hauled, haul-in lines L1, L2 which are to be reeled onto drums 62a, 62b are extended between the respective pairs of upright guides 13a, 14a and 13b, 14b and connected to the opposite wings or curtains of the net, taking the tension thereof from the trawl warps T1, T2, in the manner described in my applications Serial Nos. 570,771 and 132,234, mentioned above. The warps T1, T2 are reeled in and the doors (not shown) at the ends thereof are secured at the stanchions S1, S2. The reeling in of the hauling lines on drums 62a, 62b, guided as they come in over the stern by the guide means 13a, 13b and 14a, 14b, restricts the net curtains laterally, and the net body when it comes aboard the vessel is transferred to and reeled in upon the central drum 63, the guides 14a, 14b being depressed previously, until only its filled codend C remains unreeled. The purse line P at the after end of the codend is released, and the catch is emptied from the codend, into the segregating means at 7. Upon restoring the purse line the net is ready to be reset.

It is also with resetting that the present invention is concerned. The net is heavy and rather bulky; it must be lead aft directly over the stern, and over the ramp structure to avoid fouling; and it must be controllable as it pays out, in order that the trawl warps T1, T2 and the doors can be reconnected at the opposite sides. This is not easy to do with the small crew usually aboard a shrimp trawler, and in the dark, when most shrimp trawling is done. Power means to effect handling of the net during resetting are highly desirable, and are provided by this invention.

FIGURES 5 and 6 illustrate the first step in resetting the net. The haul-out line H, such as extends from a drum 64b of the winch means, is lead by way of a block B on the boom 95 first outside the line guide means 31, 32, thence about the guides 13b and 3, and then inboard over the ramp platform and forward until it can be connected to the codend C at a point R ahead of the pursed after end thereof. Now the haul-out line H is reeled in, causing drum 63 to pay out, and the codend, crowded laterally together and doubled back at the point R, follows down the ramp, around the guides 13b and 3, and to the line guides 31, 32. As the pursed end of the codend leaves the ramp structure 1 it hangs free towards or into the water. FIGURES 7 and 8 show this condition. The vessel at this time is moving slowly ahead. A crewman can now release the connection at R, whereupon the extra length of the codend, from 3 to 31, 32, allows the pursed end to drop into the water and to trail aft of the ramp structure as the trawler moves ahead. This condition is shown in FIGURE 8 in dot-dash lines. The trailing codend is far enough aft to eliminate the danger of fouling, and has sufficient drag that it will assure dragging out the remainder of the net as the body unreels from drum 63 and the haul-in lines and curtains from drums 62a, 62b. Finally, the haul-in lines L1, L2 are disconnected and replaced by connecting the net wings to the doors and to the trawl warps T1, T2 over the sides, and the net is ready for use.

It will be noted that the resetting involves the use of a haul-out line extending, guided, and connected in a particular way, and that by following the described method the resetting can be accomplished with practically no danger of fouling, with a minimal crew, and in quite heavy weather. Thus the actual productive trawling time can be increased, with the expectation of larger catches in a given period of time.

By way of explanation, the segregating means 7 which receives the catch includes side walls 73a, 73b and a flexible bottom 74 looped between forward and aft fixed transverse bars 75a, 75b, and elevated by an intermediate transverse bar 76a, lifted by the lever arms 76b and 76c, which are acted upon by jacks 77. The side walls 73a, 73b are notched to receive the bar 76a. Elevation of the bottom 74 with its catch allows the catch to spill onto the segregating table 72. There the shrimps are picked out, decapitated, and the heads and other debris are thrown or pushed into chutes 70 and, assisted by water jets 70a, go overboard.

The catch, when it is brought up from the ocean floor and deposited in the segregator bin, is usually somewhat muddy. Therefore the flexible bottom 74 is perforated to permit the drainage downward and out through opening 70b into chute 70 thence overboard of the water used for the required rinsing of the catch. The decapitated shrimps are collected in a container 71, adjacent the sorting table 72, and are dumped into the chutes 82, accessible by raising the auxiliary hatch cover 81, and so are delivered into refrigerated hold spaces below the deck 91.

Also, for reasons explained in my copending application Serial No. 856,806, mentioned above, the inside guides 14a and 14b of each pair at the stern are each depressible or erectable at will. A jack 14c (FIGURE 3) can be used to effect such movements.

Figure 4:
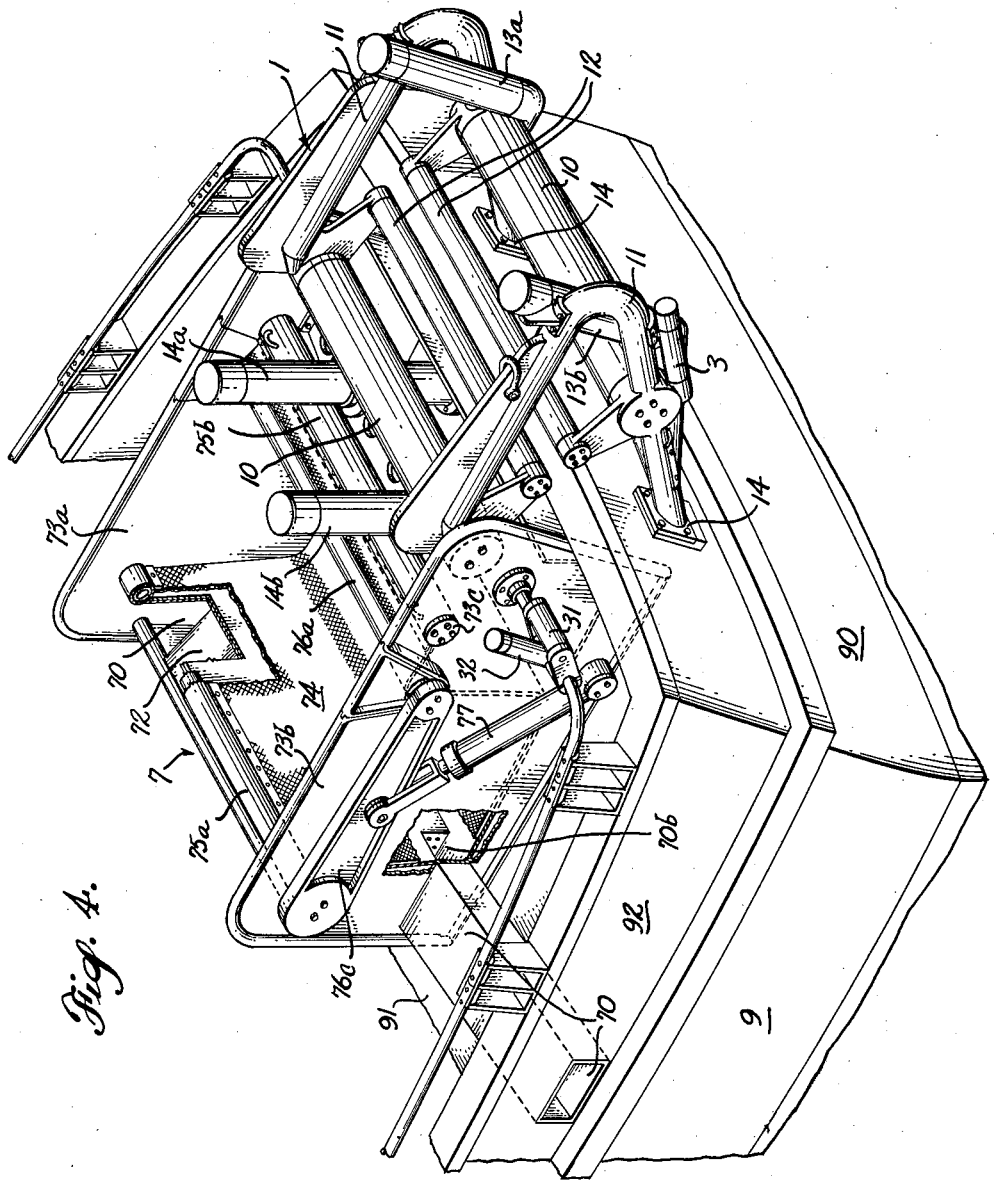
FIGURE 4 is an isometric view of the stern of the trawler, partly broken away, illustrating the mechanism in position of use, but with the net, lines, etc. omitted.

When not trawling the ramp structure 1 may be stowed inboard. The securement at 14 is released, and the ramp structure is swung bodily about its inboard roller 10 as an axis. The guides 14a, 14b may be depressed, and the transverse element 75b of the segregating device 7 can be removed by withdrawing its supports at 73c on each end. Then it is brought forward with the flexible bottom 74 and stowed on the segregating table 72 (FIGURE 4) in order to permit the ramp structure to fold down over the segregating device as a whole, the transverse bar 76a first being raised to permit this then being lowered again.

I claim as my invention:

1. A method of setting a trawl net which includes a codend, over the stern of a vessel which has a ramp structure projecting outboard aft of its stern, and multiple-drum power winch means, on a drum whereof the net may be reeled in, said method comprising leading a haul-out line astern from the winch means outside of and then forward about and within the ramp structure, connecting the haul-out line to the reeled-in codend, ahead of its purse line, hauling on said line to draw the codend astern over the ramp structure and then forwardly sufficiently to afford access to the haul-out line at its connection to the codend, and to allow the pursed end of the codend to trail in the water, and releasing said haul-out line from the codend, to trail the latter in the water aft of the vessel as it is payed out over the ramp structure.

2. A method of setting a trawl net which includes a codend pursed at its after end, over the stern of a vessel which has a ramp structure projecting aft of its stern, with laterally spaced guides between which the net is hauled in, and power winch means, on a drum whereof the net may be reeled in, said method comprising leading a haul-out line astern and outside of one such guide, thence forwardly over the ramp structure and between the guides, connecting the haul-out line to the reeled-in codend, ahead of its purse line, hauling on said line until its connection to the codend has been drawn about the one such guide and to the bulwark, leaving the codend trailing in the water, and releasing the codend from the haul-out line, to allow the already trailing codend to sink, directly aft of the ramp, and by its drag in the water completing the hauling out of the net.

3. A ramp structure for mounting upon the stern of a trawler, to facilitate hauling in and out of a trawl net by power winch means, said ramp structure comprising a port and a starboard bracket for securement to the stern in position to project outboard, a plurality of transverse elements interconnecting the brackets and defining a platform to support the net during such hauling, and upright line guide means located adjacent the outboard end of the ramp structure, at one side at least.

4. A ramp structure for mounting upon the stern of a trawler, to facilitate hauling in and out of a trawl net by power winch means, said ramp structure comprising a port and a starboard bracket for securement to the stern in position to project outboard, transverse elements connecting said brackets, below the level of the tops thereof, to support and guide the net during hauling, and two paired line guides upstanding during hauling at each of the opposite sides of the ramp structure, one guide of each pair being ahead of and laterally closer to the keel line than the other guide of such pair.

5. A ramp structure for mounting upon the stern of a trawler, such as has a stern bulwark, to facilitate hauling in and out of a trawl net, and comprising net supporting means which are generally horizontal in use, and means supporting the same projecting outboard from the stern when the net supporting means are in use, a pair of line guide means at the port side of said ramp structure and a companion pair at the starboard side, of the two line guide means of each pair one being located adjacent the outboard end of the ramp structure and laterally outwardly of its paired guide means, and the latter being located adjacent the inboard end of the ramp structure.

6. The combination of claim 5, wherein the laterally inner of the respective pairs of line guide means is mounted for depression below the net supporting means, for passage of the net's bosom during hauling in.

7. A ramp structure as in claim 5, including means for depressing the forward one of each pair of line guide means beneath the ramp level, at will, and for raising it thereabove.

8. A ramp structure as in claim 3, including an additional upright line guide at each side of and adjacent the end of the ramp structure which is inboard during use, and spaced more closely than the first-mentioned line guides, and means to raise or to lower the last-mentioned line guides at will.

9. In combination with a ramp structure as in claim 3, additional line guide means including an upright and a crossed horizontal roller supported at the stern outside of one of said brackets, to accomodate a line which passes about the ramp-mounted upright guide means.

10. A ramp structure for mounting upon the stern of a trawler, such as has a stern bulwark, as a support for a trawl net during its hauling in or out over the stern by lines, said ramp structure comprising a plurality of generally horizontal elements defining a platform, means to support said platform at bulwark level, projecting outboard from the stern, upstanding net guide means at each side of said platform for engagement by the net as it moves over the platform, and a line guide means in addition to said net guide means, for guidance of a haul-out line, and located adjacent the outboard end of said platform, at one side at least, and outboard of said net guide means.

11. A ramp structure as in claim 10, and two upstanding guide means at the respective sides of the platform, spaced laterally inwardly of said net guide means and cooperating with the latter to define a further line guiding means located inboard of the previously mentioned line guide means.

References Cited in the file of this patent

UNITED STATES PATENTS

| | | |
|---|---|---|
| 1,601,893 | Vigneron | Oct. 5, 1926 |
| 1,863,989 | Liisanantti | June 21, 1932 |
| 2,579,787 | Burney | Dec. 25, 1951 |
| 2,645,455 | Rowe | July 14, 1953 |
| 2,814,145 | Fredericks | Nov. 26, 1957 |
| 2,816,385 | Luketa | Dec. 17, 1957 |
| 2,966,274 | Price | Dec. 27, 1960 |

FOREIGN PATENTS

| | | |
|---|---|---|
| 19,725 | Great Britain | of 1895 |